Aug. 23, 1960 R. J. EMINGER 2,949,789
HIGH SPEED STATOR WINDING APPARATUS
Filed Feb. 27, 1958 3 Sheets-Sheet 1
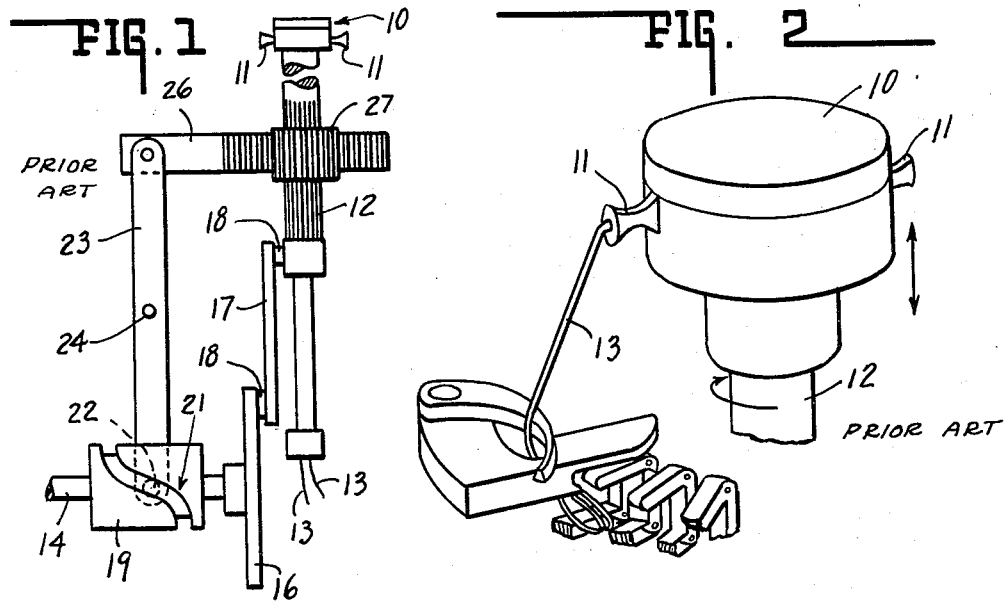
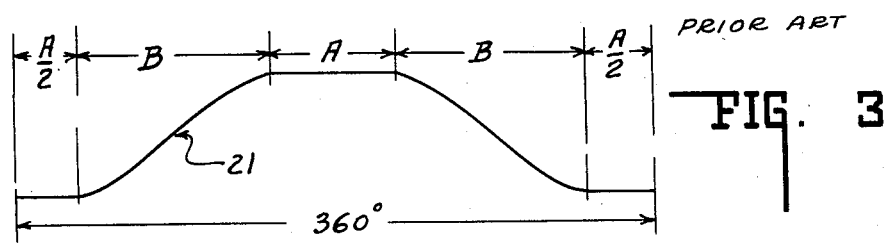
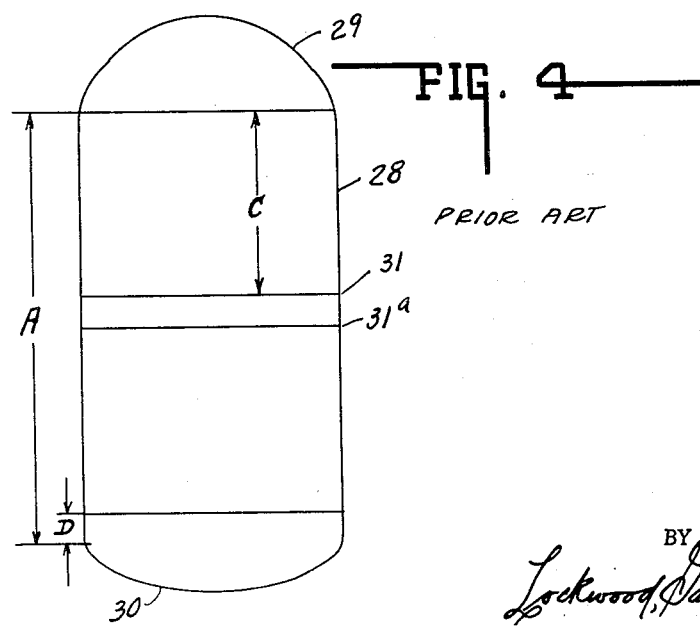
INVENTOR.
ROBERT J. EMINGER.
BY
Lockwood, Galt, Woodard & Smith.
ATTORNEYS.

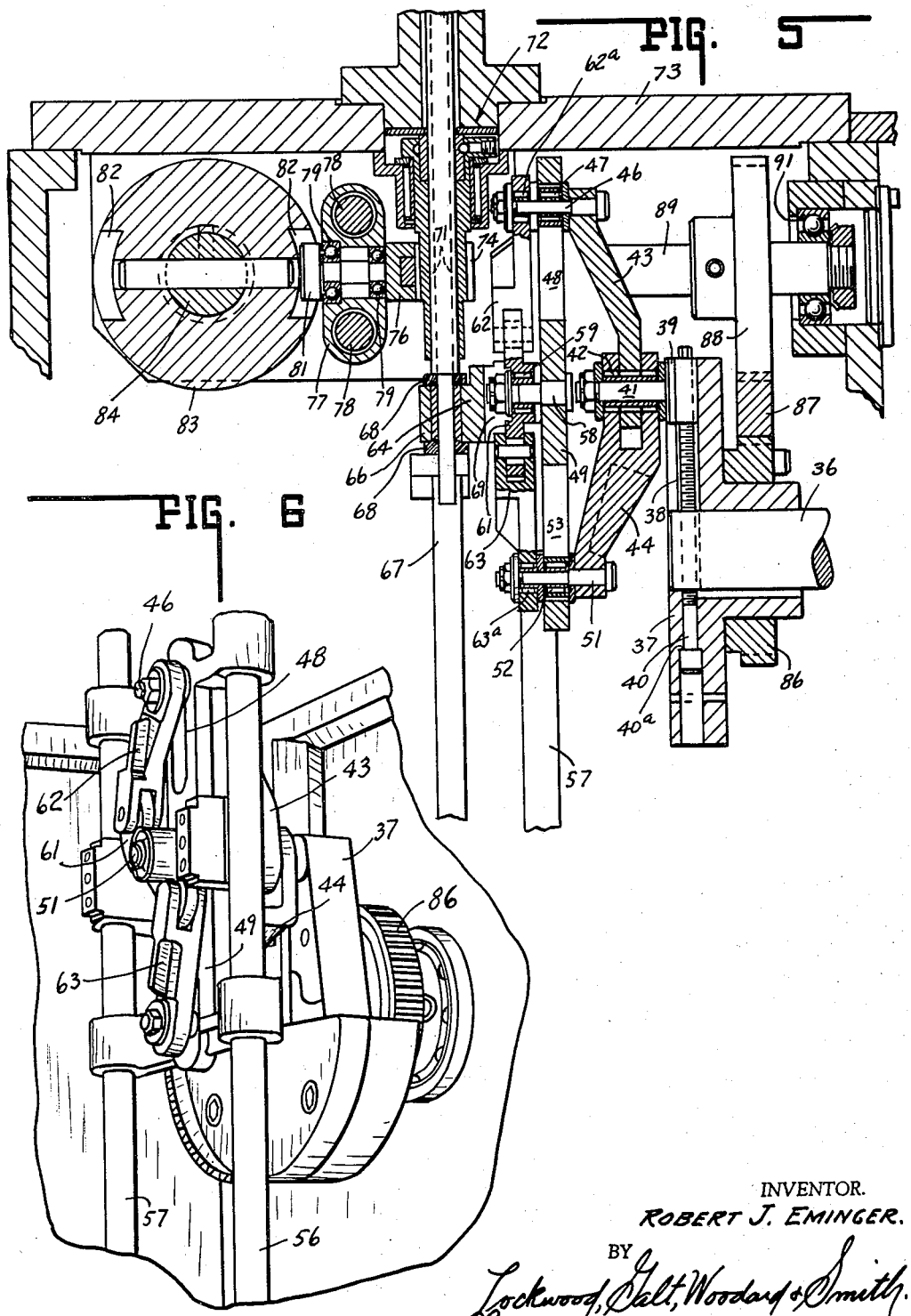

Aug. 23, 1960 R. J. EMINGER 2,949,789
HIGH SPEED STATOR WINDING APPARATUS
Filed Feb. 27, 1958 3 Sheets-Sheet 3

INVENTOR.
ROBERT J. EMINGER
BY
Lockwood, Galt, Woodard & Smith
ATTORNEYS

United States Patent Office 2,949,789
Patented Aug. 23, 1960

2,949,789

HIGH SPEED STATOR WINDING APPARATUS

Robert J. Eminger, Kendallville, Ind., assignor to Fort Wayne Tool, Die & Engineering Company, Fort Wayne, Ind., a company of Indiana Filed Feb. 27, 1958, Ser. No. 717,887

6 Claims. (Cl. 74—23)

This invention relates generally to a means for transforming rotary motion to reciprocatory motion, and in particular to such means characterized by relatively low mass and resistance to wear thereby being particularly adapted for use in high speed stator winding operations.

In Patent 2,847,170 issued to John F. Lill and Robert J. Eminger on August 12, 1958, titled Winding Apparatus for Distributed Wound Stators, and assigned to the assignee of the present invention, there is disclosed a stator winding apparatus in which a winding head is actuated so as to move a wire dispensing member in a generally rectangular path. This rectangular path of movement is obtained by sequentially applying a rotary motion and a reciprocating linear motion to the winding head. The drive apparatus disclosed in the above mentioned copending application produces a winding path which, because of inherent limitations in the winding head drive means, cannot be utilized to maximum efficiency and limits the height of a stator core or "stack" upon which wire can be wound.

The present invention provides an improved form of drive means for producing the reciprocating linear motion required for the winding head which can be properly synchronzied with the alternating rotary motion applied to the winding head.

A further object of the present invention is to proivde a motion transmission means for converting rotary motion to reciprocating motion, characterized by low mass and resistance to wear and therefore particularly adapted for high speed operation.

A further object of the present invention is to provide a drive means for a stator winding head in which variations in the velocity of withdrawal of the wire from the head are maintained at a minimum.

A further object of the present invention is to provide a drive means for sequentially producing reciprocating linear and rotary motion in a winding head, the rotary motion being provided by a cam having dwell and changeover portions, the reciprocating linear motion of the winding head being so synchronized with its rotary motion that the midpoint of its reciprocating stroke occurs substantially at the center of a dwell portion of the cam.

These and other objects will become apparent as the description proceeds with reference to the accompanying drawings in which:

Fig. 1 represents a fragmentary, schematic view of a conventional winding head drive means.

Fig. 2 represents a fragmentary view of the winding head and associated parts illustrating the path of movement of the wire dispensing element.

Fig. 3 represents a view of the developed contour of the cam slot formed in the cam shown in Fig. 1.

Fig. 4 illustrates the winding path or path of movement of the winding head when actuated by a conventional driving means.

Fig. 5 represents a side sectional view of a drive means embodying the present invention.

Fig. 6 is a perspective view of the drive means.

Figures 7, 8:
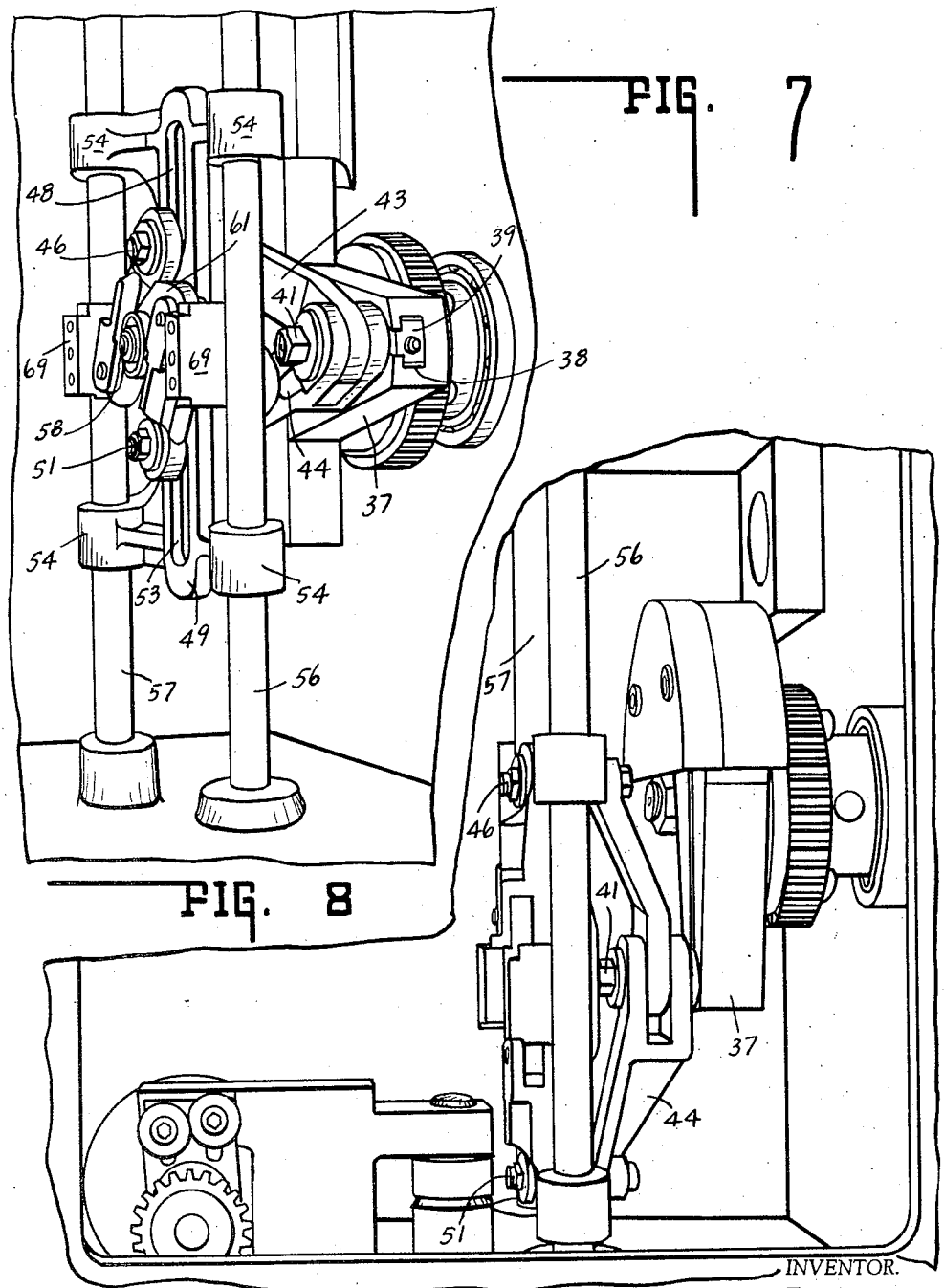
Fig. 7 is a view similar to Fig. 6 but illustrating the drive means at a different point in its cycle.
Fig. 8 is a view similar to Fig. 7 but illustrating the drive means at a still different point in its cycle.

Referring initially to Figs. 1, 2, 3 and 4, there is shown at 10 a winding head having extending therefrom wire dispensing elements 11. The winding head is mounted upon a splined shaft 12 through which a supply of wire 13 is fed for dispensing through the elements 11, as will be particularly apparent from Fig. 2. A drive shaft 14 rotates a disc 16 to which is pivotally mounted a crank arm 17 having a pivotal connection with the shaft 12 at 18. It will be apparent from the foregoing that, as shaft 14 is rotated, the crank arm will linearly reciprocate the winding head.

The drive shaft has further mounted thereon a barrel cam 19 provided with a continuous cam slot 21. The slot cooperates with a cam follower 22 carried by a link 23 pivotally supported at 24. The upper end of the link is pivotally connected to a rack 26 which cooperates with a pinion gear 27. The splined shaft 12 is slidable within the pinion gear, however, rotation of the gear by the rack rotates the splined shaft and consequently the winding head. It will be understood that rotation of the barrel cam by the drive shaft serves to reciprocate the rack imparting an alternating rotary motion to the winding head.

As will be apparent from Fig. 2, the reciprocating and rotary oscillating motions of the head must occur sequentially so that the wire dispensing elements 11 may be brought vertically upward through the stator slots and then angularly positioned for return downward through a stator slot spaced from the slot accommodating the upward stroke of the winding element. Referring to Fig. 3 there is illustrated the developed contour of the cam slot 21. The slot is made up of dwell portions A and changeover portions B. It will be evident that during the dwell portions the rack 26 is stationary and that as the cam follower traverses the changeover portions the rack is moved, imparting a rotary motion to the winding head.

Efficient utilization of the winding stroke requires that the center of the vertical linear stroke, provided by crank arm 17, occur at the center of the dwell portion of the barrel cam slot. It is characteristic of crank arm arrangements, such as that shown in Fig. 1, that the midpoint of the stroke of the driven member is not reached when the driving member, such as disc 16, has rotated through 90° from a point establishing one limit of the stroke of the driven member. This action of the winding head will be apparent from Fig. 4 wherein the path of movement of the wire dispensing element 11 is traced. The sequential rotary and vertical motions imparted to the winding head result in a winding path which has vertical portions 28 and curved end portions 29 and 30. The horizontal line 31a superimposed upon the tracing of the winding path indicates the center of the dwell portion A of the barrel cam slot. It will be clear that the center of the vertical stroke of the winding head, indicated by line 31, does not coincide with the center of the dwell, the stroke being greater on the upper side of the line 31. Because of the failure of the center of vertical stroke to coincide with the center of dwell, the upper portion 29 of the winding path is more curved than is the lower portion 30. Since the wire dispensing element 11 must clear the upper margin of the stator core being wound, it will be evident that the dimension indicated at C in Fig. 4 defines one-half of maximum height of a stator core which can thus be wound. An increment of the total dwell A of the barrel cam slot, measured by dimension D in Fig. 4, is thus unused.

The present invention provides an improved motion transmission means in which the center of dwell of the cam slot can be made to substantially coincide with the center of the vertical stroke of the winding head, thus permitting the winding of a stator of greater height. In the improved motion transmission means since substantially all of the dwell portion of the cam slot can be utilized for winding stator cores of a given height, the dwell portion of the barrel cam may be shorter, thereby permitting longer, less abrupt changeover portions and consequently less changes in the velocity of the wire leaving the wire dispensing elements. Since any change in the velocity of the wire stresses the wire in proportion to the magnitude of the velocity change, the desirability of this feature is obvious. The improved drive means embodying the present invention will now be described with reference to Fig. 5.

The reference numeral 36 indicates a drive shaft to which is keyed a member 37 provided with a T-slot 38. Adjustably mounted within the T-slot is a block 39 having a crank pin 41 extending therefrom. A threaded pin 40, extending through the slot, has a head bottoming on an internal shoulder 40a formed in the member 37, the counterbore providing the shoulder being axially aligned with the slot 38. The pin 40 is threaded through the block 39 and provides a means for adjustably positioning the block along the slot 38. The pin 41 supports a needle bearing assembly 42 upon which is pivotally mounted connecting rods 43 and 44. The connecting rod 44 has a bifurcated end accommodating the corresponding end of the rod 43, thereby providing for coaxial pivotal support of the two connecting rods. The end of connecting rod 43 carries a pin 46 which is provided with a bearing assembly 47 slidably accommodated within a slot 48 in a cross head 49. The end of connecting rod 44 accommodates a similar pin 51 which, by means of bearing assembly 52, rides within the slot 53 formed identically with the slot 48 in the cross head.

As may best be seen in Fig. 7, the cross head is of generally rectangular configuration and is provided with tubular members 54 through which support shafts 56 and 57 extend, thereby providing a means for mounting the cross head, permitting it to be moved linearly upon the shafts. At its center the cross head has extending therefrom a pin 58 which by means of a needle bearing assembly 59 pivotally supports an equalizer bar 61. The equalizer bar is generally S-shaped, as may be seen in Fig. 7, and at one extremity pivotally supports a link member 62. The opposite end of link member 62 is pivotally secured on the pin 46 by a bearing assembly 62a. A link member 63 is pivotally secured by a suitable bearing assembly on the pin 51 and the lower end of the link member 63 is pivotally supported by means of bearing assembly 63a on the extending end of the pin 51.

Centrally across its face the cross head carries a plate 64. The plate 64 has a tubular portion 66 extending centrally therefrom accommodating the hollow shaft 67. Suitable bearing washers 68 carried on the shaft 67 serve to secure the shaft against linear movement relative to the plate 64, but permit free rotation of the shaft. The plate 64 is removably secured to the bosses extending from the cross head, the bosses being shown more clearly in Fig. 7, wherein the plate 64 has been removed for clarity.

It will be understood that the shaft 67 is the counterpart of the shaft 12 referred to with regard to Fig. 1 and accommodates through its central bore the wire which is to be dispensed from the winding head mounted upon the upper end (not shown) of the shaft 67. The shaft 67 is provided with splines 71 and is supported by a bearing assembly 72 carried in a plate 73. The plate 73 is shown only fragmentarily in Fig. 5, and forms a part of the housing for the drive mechanism. The splines formed in shaft 67 mesh with a pinion 74 slidable therealong, the pinion engaging with a rack 76 carried by a support member 77. The support member is mounted for linear motion by means of spaced, parallel shafts 78 which extend slidably through openings in the support member. Ball bearing members 79 carried by the support member serve to rotatably mount a cam follower or roller 81. The cam follower cooperates with a cam slot 82 formed in a barrel cam 83 mounted on the shaft 84 and rotated thereby.

It will be evident that the rack 76 is the counterpart of the rack 26 referred to with regard to Fig. 1, the pinion 74 is the counterpart of the pinion 27 of Fig. 1, and the cam follower 81 is the counterpart of cam follower 22 of Fig. 1. It will be further evident that as the cam 83 is rotated, the cam follower will traverse the slot 82, causing the member 77 to reciprocate along the shafts 78. This action of the member 77 causes the rack to provide a rotary impulse to the shaft 67 as the cam follower traverses the change-over portions (such as indicated at B in Fig. 3) of the cam track. As the cam follower traverses the dwell portions of the cam track (such as indicated at A in Fig. 3), the rack 76 will remain stationary.

The shaft 84 accommodating the barrel cam is rotated by means of a gear 86 keyed on member 37. The gear 86 meshes with an intermediate gear 87 (only a portion of which is shown in Fig. 5) which in turn meshes with a gear 88 carried by a shaft 89 extending transverse to, and to the rear of the shaft 67. The shaft 89 is journaled at 91 and at its opposite end carries a mitre gear (not shown) which, in turn, meshes with a second mitre gear (not shown) carried by the shaft 84. It may thus be seen that rotation of the drive shaft 36 is transmitted through the gearing just described to the shaft 84 carrying the barrel cam.

The operation of the drive means for providing the vertical reciprocation of the shaft 67, and consequently of the winding head, will now be described with reference to Figs. 6, 7 and 8. With the member 37 in its position of Fig. 6, the connecting rods 43 and 44 will extend in generally opposite directions, corresponding to their positions in Fig. 5, and the pins 46 and 51 will be positioned adjacent the outer ends of the slots 48 and 53, respectively. As the member 37 moves through 90° to its position of Fig. 7, the cross head 49 will move downwardly to the midpoint of its vertical stroke, and the pins 46 and 51 will move to a position adjacent the inner ends of their respective slots.

As the member 37 moves through 90°, from its position of Fig. 7 to its position of Fig. 8, the connecting rods 43 and 44 will again assume their extended position, and the pins 51 and 46 will again be positioned adjacent the outer extremities of the slots 53 and 48, respectively. During this movement of the member 37, the cross head 49 will be moved to the lower extremity of its vertical stroke. It may thus be seen that as the member 37 moves the pin 41 through a circular path, the cross head will be actuated in simple harmonic motion along the supporting shafts 56 and 57. It should also be noted that, as distinguished from the conventional crank arm linkage described with reference to Fig. 1, the linkage embodying the present invention provides for the complete stroke of the cross head to occur upon 180° rotation of the drive shaft, with the midpoint of the cross head stroke occurring after 90° of rotation of the drive shaft. While the plate 64 and the shaft 67 accommodated therein have been removed from Figs. 6, 7 and 8 for purposes of clarity, it will be understood that motion imparted to the cross head serves to vertically reciprocate the shaft 67 and consequently the winding head.

It will, of course, be apparent that the simple harmonic motion which is provided the cross head by the linkage just described might also be provided by a conventional Scotch yoke arrangement. This type of motion transmission means, however, has been found to be unsatisfactory for high speed stator winding apparatus, since it is characterized by relatively large mass and by excessive wear of the required slot and cooperating parts. In the motion transmission means of the present invention it will be apparent that as the pin 41 is moved in a circular path, the load will be divided by the connecting rods 43 and 44 and the links 62 and 63 and will be applied at each end of the equalizer bar 61. The bearing 59 accommodates this load and is far less subject to wear than would be the slot which forms its counter-part in the conventional Scotch yoke construction.

The present invention thus provides a motion transmission means particularly adapted for use on high speed stator winding apparatus and characterized by the relatively low mass of the cross head and related parts, by reduced wear as compared to a conventional Scotch yoke arrangement, and by the occurrence of the midpoint of the linear stroke of the driven member with each 90° of movement of the driving member as distinguished from a conventional crank arm arrangement.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a stator winding apparatus of the type in which a winding head moves relative to a slotted stator in a path sequentially parallel to and transverse to the axis of the stator bore in placing a winding between two angularly separated stator slots: a rotating drive shaft, means for driving said winding head through the transverse portion of its path including a barrel cam rotated by said drive shaft and having a continuous cam slot therein, a cam follower cooperating with said slot and operatively connected to said winding head, said cam slot having dwell portions separated by change-over portions, the transverse motion of said winding head occurring as said cam follower traverses said change-over portions, and means for driving said winding head through the parallel portion of its path with the extremities of the winding head movement in said parallel portion of its path occurring substantially at the midpoint of the dwell portions of said cam slot, said last-mentioned means comprising a drive member moved through a circular path by said drive shaft, dual connecting rods coaxially pivoted on said member, a cross head supported for reciprocal linear movement and operatively connected to said winding head, means providing spaced aligned slots on said cross head extending in the direction of movement thereof, the free ends of said connecting rods each carrying a member slidably received within a respective one of said slots, an equalizer bar pivotally supported at its midpoint on said cross head, the support for said equalizer bar being aligned with the axis of said slots, and a link member pivotally extending from each end of said equalizer bar and pivotally joined respectively to one of said members received within said slots, whereby as said drive member moves through its circular path said cross head is reciprocated with a simple harmonic motion, with the forces exerted on said cross head being uniformly applied at both ends of said equalizer bar.

2. In a stator winding apparatus of the type in which a winding head moves relative to a slotted stator in a path sequentially parallel to and transverse to the axis of the stator bore in placing a winding between two angularly separated stator slots: a rotating drive shaft, means for driving said winding head through the transverse portion of its path including a barrel cam rotated by said drive shaft and having a continuous cam slot therein, a cam follower cooperating with said slot and operatively connected to said winding head, said cam slot having dwell portions separated by change-over portions, the transverse motion of said winding head occurring as said cam follower traverses said change-over portions, and means for driving said winding head through the parallel portion of its path with the extremities of the winding head movement in said parallel portion of its path occurring substantially at the midpoint of the dwell portions of said cam slot, said last-mentioned means comprising a drive member moved through a circular path by said drive shaft, dual connecting rods coaxially pivoted on said member, a cross head supported for reciprocal linear movement and operatively connected to said winding head, means providing slots on said cross head, the free ends of said connecting rods each carrying a member slidably received within a respective one of said slots, an equalizer bar pivotally supported on said cross head, and a link member pivotally extending from each end of said equalizer bar and pivotally joined respectively to one of said members received within said slots, whereby as said drive member moves through its circular path said cross head is reciprocated with a simple harmonic motion, with the forces exerted on said cross head being applied at both ends of said equalizer bar.

3. In a stator winding apparatus of the type in which a winding head moves relative to a slotted stator in a path sequentially parallel to and transverse to the axis of the stator bore in placing a winding between two angularly separated stator slots: a rotating drive shaft, means for driving said winding head through the transverse portion of its path including a cam rotated by said drive shaft and having a cam slot therein, a cam follower cooperating with said slot and operatively connected to said winding head, said cam slot having dwell portions separated by change-over portions, the transverse motion of said winding head occurring as said cam follower traverses said change-over portions, and means for driving said winding head through the parallel portion of its path with the extremities of the winding head movement in said parallel portion of its path occurring substantially at the midpoint of the dwell portions of said cam slot, said last-mentioned means comprising a drive member moved through a circular path by said drive shaft, dual connecting rods coaxially pivoted on said member, a cross head supported for reciprocal linear movement and operatively connected to said winding head, means providing slots on said cross head, the free ends of said connecting rods each carrying a member slidably received within a respective one of said slots, an equalizer bar pivotally supported on said cross head, and a link member pivotally extending from each end of said equalizer bar and pivotally joined respectively to one of said members received within said slots, whereby as said drive member moves through its circular path said cross head is reciprocated, with the forces exerted on said cross head being applied at both ends of said equalizer bar.

4. An apparatus for converting continuous rotary motion into reciprocal linear motion comprising: a drive member adapted to be moved through a circular path, dual connecting rods coaxially pivoted on said drive member, a driven member supported for reciprocal linear movement, means providing spaced aligned slots on said driven member extending in the direction of movement thereof, the free ends of said connecting rods each carrying a member slidably received within a respective one of said slots, an equalizer bar pivotally supported at its midpoint on said driven member, the support for said equalizer bar being aligned with the axis of said slots, and a link member pivotally extending from each end of said equalizer bar and pivotally joined respectively to one of said members received within said slots, whereby as said drive member moves through its circular path said driven member is reciprocated with a simple harmonic motion, with the forces exerted on said driven member being uniformly applied at both ends of said equalizer bar.

5. An apparatus for converting continuous rotary motion into reciprocal linear motion comprising: a drive member adapted to be moved through a circular path, dual connecting rods pivoted on said drive member, a driven member supported for reciprocal linear movement, means providing slots on said driven member extending in one direction of movement thereof, the free ends of said connecting rods each carrying a member slidably received within a respective one of said slots, an equalizer bar pivotally supported on said driven member, and a link member pivotally extending from each end of said equalizer bar and pivotally joined respectively to one of said members received within said slots, whereby as said drive member moves through its circular path said driven member is reciprocated with a simple harmonic motion, with the forces exerted on said driven member being applied at both ends of said equalizer bar.

6. An apparatus for converting continuous rotary motion into reciprocal linear motion comprising: a drive member adapted to be moved through a circular path, dual connecting rods pivoted on said drive member, a driven member supported for reciprocal linear movement, an operative connection between said driven member and said connecting rods permitting both rotary and linear relative movement therebetween, said operative connection including an equalizer bar pivotally supported on said driven member, and a link member pivotally extending from each end of said equalizer bar and pivotally joined respectively to one of said connecting rods, whereby as said drive member moves through its circular path said driven member is linearly reciprocated, with the forces exerted on said driven member being applied at both ends of said equalizer bar and concentrated at said pivotal support thereof.

References Cited in the file of this patent
UNITED STATES PATENTS

| | | |
|---|---|---|
| 759,423 | Dietz | May 10, 1904 |
| 956,462 | Windsor | Apr. 26, 1910 |
| 1,407,033 | Huggins | Feb. 21, 1922 |
| 1,977,828 | Laib et al. | Oct. 23, 1934 |
| 2,624,518 | Scofield et al. | Jan. 6, 1953 |
| 2,689,677 | Unger | Sept. 21, 1954 |